(12) United States Patent
Jeong et al.

(10) Patent No.: US 12,337,661 B2
(45) Date of Patent: Jun. 24, 2025

(54) HEAT PUMP SYSTEM FOR VEHICLE

(71) Applicants: Hyundai Motor Company, Seoul (KR); Kia Corporation, Seoul (KR)

(72) Inventors: Seong-Bin Jeong, Hwaseong-Si (KR); Dong Seok Oh, Hwaseong-Si (KR); Namho Park, Suwon-Si (KR); Wan Je Cho, Hwaseong-Si (KR); Seung Hyun Won, Gunpo-Si (KR); Jungha Park, Gunpo-Si (KR); ChangMin Park, Seoul (KR); Ji Wan Son, Yongin-Si (KR); Yeonho Kim, Seoul (KR); ByeonGgu Kang, Hwaseong-Si (KR); Jong Il Park, Hwaseong-Si (KR); Hyunjae Lee, Yongin-Si (KR); Jinsung Park, Hwaseong-Si (KR); Jae Yeon Kim, Hwaseong-Si (KR); Yong Woong Cha, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 218 days.

(21) Appl. No.: 18/209,313

(22) Filed: Jun. 13, 2023

(65) Prior Publication Data
US 2024/0246396 A1    Jul. 25, 2024

(30) Foreign Application Priority Data
Jan. 19, 2023   (KR) .......................... 10-2023-0007850

(51) Int. Cl.
*B60H 1/32* (2006.01)

(52) U.S. Cl.
CPC .................................. *B60H 1/3228* (2019.05)

(58) Field of Classification Search
CPC .............. B60H 1/3228; B60H 1/00392; B60H 1/00885; B60H 1/00921; B60H 1/143; B60H 1/00278; B60H 1/00007; B60H 1/004; B60H 1/03; B60H 1/3204; B60H 1/32284; B60H 1/3213; B60H 2001/00307; B60Y 2200/90
See application file for complete search history.

(56) References Cited

U.S. PATENT DOCUMENTS

| 8,336,319 | B2 | 12/2012 | Johnston et al. | |
| 2015/0000327 | A1* | 1/2015 | Kakehashi | H01M 10/625 |
| | | | | 62/434 |
| 2015/0273976 | A1* | 10/2015 | Enomoto | B60L 3/0046 |
| | | | | 62/243 |

(Continued)

FOREIGN PATENT DOCUMENTS

KR    20210152794 A   * 12/2021   .......... B60H 1/2221

*Primary Examiner* — Emmanuel E Duke
(74) *Attorney, Agent, or Firm* — MORGAN, LEWIS & BOCKIUS LLP

(57) ABSTRACT

A heat pump system for a vehicle is configured by including a valve, a first cooling apparatus, a second cooling apparatus, and a flow control line, to be configured for adjusting a temperature of a battery module by use of a single chiller where a refrigerant and a coolant are heat-exchanged, selectively recollecting waste heat of the electrical component and the battery module and using the same for heating of the vehicle interior, and forming a plurality of coolant flowing lines by a single valve according to selected mode of the vehicle.

22 Claims, 6 Drawing Sheets

(56) References Cited

U.S. PATENT DOCUMENTS

| | | | |
|---|---|---|---|
| 2016/0167481 A1* | 6/2016 | Makihara | B60H 1/03 237/5 |
| 2016/0178253 A1* | 6/2016 | Katoh | B60H 1/32284 62/185 |
| 2021/0252942 A1* | 8/2021 | Jeong | B60H 1/3213 |
| 2021/0402844 A1* | 12/2021 | Kim | B60H 1/00392 |
| 2022/0032736 A1* | 2/2022 | Kim | B60H 1/00899 |
| 2023/0204119 A1* | 6/2023 | Oh | F16K 31/041 137/625 |
| 2023/0211647 A1* | 7/2023 | Jo | B60H 1/3213 62/159 |
| 2024/0010046 A1* | 1/2024 | Kim | B60H 1/00278 |

\* cited by examiner

HEAT PUMP SYSTEM FOR VEHICLE

CROSS-REFERENCE TO RELATED APPLICATION

The present application claims priority to Korean Patent Application No. 10-2023-0007850 filed on Jan. 19, 2023, the entire contents of which is incorporated herein for all purposes by this reference.

BACKGROUND OF THE PRESENT DISCLOSURE

Field of the Present Disclosure

The present disclosure relates to a heat pump system for a vehicle. More particularly, the present disclosure relates to a heat pump system for a vehicle capable of adjusting a temperature of a battery module by use of a single chiller where a refrigerant and a coolant are heat-exchanged, selectively recollecting waste heat of the electrical component and the battery module and using the same for heating of the vehicle interior, and forming a plurality of coolant flowing lines by a single valve according to selected mode of the vehicle.

Description of Related Art

Generally, an air conditioning system for a vehicle includes an air conditioner unit circulating a refrigerant to heat or cool an interior of the vehicle.

The air conditioner unit, which is to maintain the interior of the vehicle at an appropriate temperature regardless of a change in an external temperature to maintain a comfortable internal environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environment-friendly vehicle capable of substantially substituting for an internal combustion engine vehicle is required, and the environment-friendly vehicle is classified into an electric vehicle driven using a fuel cell or electricity as a power source and a hybrid vehicle driven using an engine and a battery.

In the electric vehicle or the hybrid vehicle among these environment-friendly vehicles, a separate heater is not used unlike an air conditioner of a general vehicle, and an air conditioner used in the environment-friendly vehicle is generally called a heat pump system.

Meanwhile, the electric vehicle driven by a power source of a fuel cell generates driving force by converting chemical reaction energy between oxygen and hydrogen into electrical energy. In the present process, thermal energy is generated by a chemical reaction in a fuel cell. Therefore, it is necessary in securing performance of the fuel cell to effectively remove generated heat.

Furthermore, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed to secure performance of the motor.

Therefore, in the hybrid vehicle or the electric vehicle according to the related art, cooling means, a heat pump system, and a battery cooling system, respectively, should be configured as separate closed circuits to prevent heat generation in the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

Furthermore, because a battery cooling system for heating or cooling the battery according to a state of the vehicle is separately provided to obtain an optimal performance of the battery, a plurality of valves for selectively interconnecting connections pipes are employed, and thus noise and vibration due to frequent opening and closing operations of the valves may be introduced into the vehicle interior, thereby deteriorating the ride comfort.

Furthermore, when heating the vehicle interior, the heating performance may deteriorate due to the lack of heat source, the electricity consumption may be increased due to the usage of the electric heater, and the power consumption of the compressor may be increased.

Furthermore, in a conventional heat pump system, it may be difficult to efficiently cool an electrical component and a battery module that have different heat generation amounts, and for the present purpose, separate component parts are required to be added, resulting in disadvantage of increasing manufacturing costs.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a heat pump system for a vehicle configured for enhancing the overall efficiency of the system by adjusting the temperature of battery module by use of a single chiller where a refrigerant and a coolant are heat-exchanged, and by selectively recollecting waste heat of the electrical component and the battery module and using the same for heating of the vehicle interior.

Furthermore, the present disclosure attempts to provide a heat pump system for a vehicle configured for simplifying a layout of the system and reducing manufacturing costs by forming a plurality of coolant flowing lines by a single valve according to selected mode of the vehicle.

A heat pump system for a vehicle includes a valve configured to control flow of a coolant which is internally introduced, according to at least one mode for temperature adjustment of a vehicle interior and temperature adjustment of an electrical component and a battery module, a first cooling apparatus which may include a first line of which a first end portion and a second end portion are connected to the valve to selectively circulate the coolant, to the electrical component and a heat-exchanger provided on the first line, a second cooling apparatus which may include a second line of which a first end portion and a second end portion are connected to the valve to selectively circulate the coolant, to the battery module and a chiller provided on the second line, and a flow control line fluidically connecting the first line and the second line.

In a selected mode among the at least one mode, the flow control line may redirect the coolant flowing through one line among the first line or the second line to another line so that a flow amount of the coolant flowing through the first line or the second line is increased.

A first end portion of the flow control line may be connected to the first line at a downstream side of the electrical component, with reference to a flow direction of the coolant flowing through the first line. A second end portion of the flow control line may be connected to the second line at a downstream side of the battery module, with reference to the flow direction of the coolant flowing through the second line.

The valve may include at least one port.

The at least one port may include a first port connected to a first end portion of a third line on which a radiator is provided, a second port connected to a first end portion of the first line, a third port connected to a second end portion of the first line, a fourth port connected to a first end portion of the second line, a fifth port connected to a second end portion of the second line, and a sixth port connected to a second end portion of the third line.

A first water pump to flow the coolant along the first line may be mounted on the second port. A second water pump to flow the coolant along the second line may be mounted on the fifth port.

The first water pump and the second water pump may be disposed at positions facing each other, with reference to the valve.

In the selected mode among the at least one mode, the first water pump and the second water pump may be operated at different rotation speeds, depending on heat generation amounts of the electrical component and the battery module so that flow amounts of the coolant flowing through the first line and the second line are different from each other.

The at least one mode may include a second mode for cooling the electrical component and the battery module by use of the coolant cooled at the radiator.

The at least one mode may further include a first mode for cooling the electrical component by use of the coolant cooled at the radiator and for cooling the battery module by use of the chiller, a third mode for heating the vehicle interior and recollecting waste heat of the electrical component, a fourth mode for heating the vehicle interior and recollecting waste heat of the electrical component and the battery module, and a fifth mode for cooling the battery module by use of the coolant cooled at the radiator.

In the first mode, the sixth port may be connected to the second port according to operation of the valve so that the first line and the third line are fluidically connected to supply the coolant cooled at the radiator to the electrical component, the third port may be connected to the first port according to operation of the valve, and the fourth port may be connected to the fifth port according to operation of the valve so that the second line forms an independent closed circuit.

In the second mode so that the first line, the second line, and the third line are interconnected to supply the coolant cooled at the radiator to the electrical component and the battery module, the sixth port may be connected to the fifth port according to operation of the valve, the fourth port may be connected to the second port according to operation of the valve, and the third port may be connected to the first port according to operation of the valve.

In the second mode, the coolant cooled at the radiator first may pass through the battery module along the second line, and then may pass through the electrical component along the first line.

In the third mode so that the first line, the second line, and the third line may form an independent closed circuit, respectively, the first port may be connected to the sixth port according to operation of the valve, the second port may be connected to the third port according to operation of the valve, the fourth port may be connected to the fifth port according to operation of the valve, and the heat-exchanger may be configured to recollect the waste heat of the electrical component from the coolant heated by cooling the electrical component.

In the fourth mode so that the first line and the second line may be interconnected to prevent the coolant having passed through the electrical component and the battery module from flowing to the radiator: the first port may be connected to the sixth port according to operation of the valve, the second port may be connected to the fourth port according to operation of the valve, the third port may be connected to the fifth port according to operation of the valve, the heat-exchanger may be configured to recollect the waste heat of the electrical component from the coolant heated by cooling the electrical component, and the chiller may be configured to recollect the waste heat of the battery module from the coolant heated by cooling the battery module.

In the fifth mode so that the second line and the third line may be connected to supply the coolant having passed through the radiator to the battery module, the first port may be connected to the fifth port according to operation of the valve, the second port may be connected to the third port according to operation of the valve, and the fourth port may be connected to the sixth port according to operation of the valve.

The flow control line may always maintain an opened state in the first, second, third, fourth and fifth modes.

In the first mode, the third mode, and the fifth mode, the coolant may be prevented from flowing along the flow control line due to separation of the first line and the second line.

In the second mode and the fourth mode, depending on heat generation amounts of the electrical component and the battery module, the flow control line may flow a partial coolant of the coolant flowing through the first line to the second line, or flows a partial coolant of the coolant flowing through the second line to the first line.

A reservoir tank may be provided on the third line and mounted on the valve at a position corresponding to the sixth port.

The heat-exchanger may be connected to the air conditioner unit through a refrigerant line so that a refrigerant is supplied from an air conditioner unit. The chiller may be connected to the air conditioner unit through a refrigerant connection line so that the refrigerant may be supplied from the air conditioner unit.

The heat-exchanger and the chiller may be water-cooled heat-exchangers that heat-exchange the internally introduced coolant with the refrigerant supplied from the air conditioner unit.

According to a heat pump system for a vehicle according to an exemplary embodiment of the present disclosure, the overall efficiency of the system may be enhanced by adjusting a temperature of a battery module by use of a single chiller where a refrigerant and a coolant are heat-exchanged, and by selectively recollecting waste heat of the electrical component and the battery module and using a same for heating of the vehicle.

Furthermore, according to an exemplary embodiment of the present disclosure, streamlining and simplification of the system may be achieved by forming a plurality of coolant flowing lines by a single valve according to selected mode of the vehicle.

Furthermore, according to an exemplary embodiment of the present disclosure, among the electrical components and the battery module provided on the lines, the flow amount of the coolant toward the side having higher heat generation amount may be increased through the flow control line, and thereby more the electrical component and the battery module may be efficiently cooled, minimizing unnecessary power consumption, and enhancing the overall marketability.

Furthermore, according to an exemplary embodiment of the present disclosure, by efficiently adjusting the temperature of the battery module, the optimal performance of the battery module may be enabled, and the overall travel distance of the vehicle may be increased due to the efficient management of the battery module.

Furthermore, according to an exemplary embodiment of the present disclosure, it is possible to reduce manufacturing cost and weight through simplification of an entire system, and to improve space utilization.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
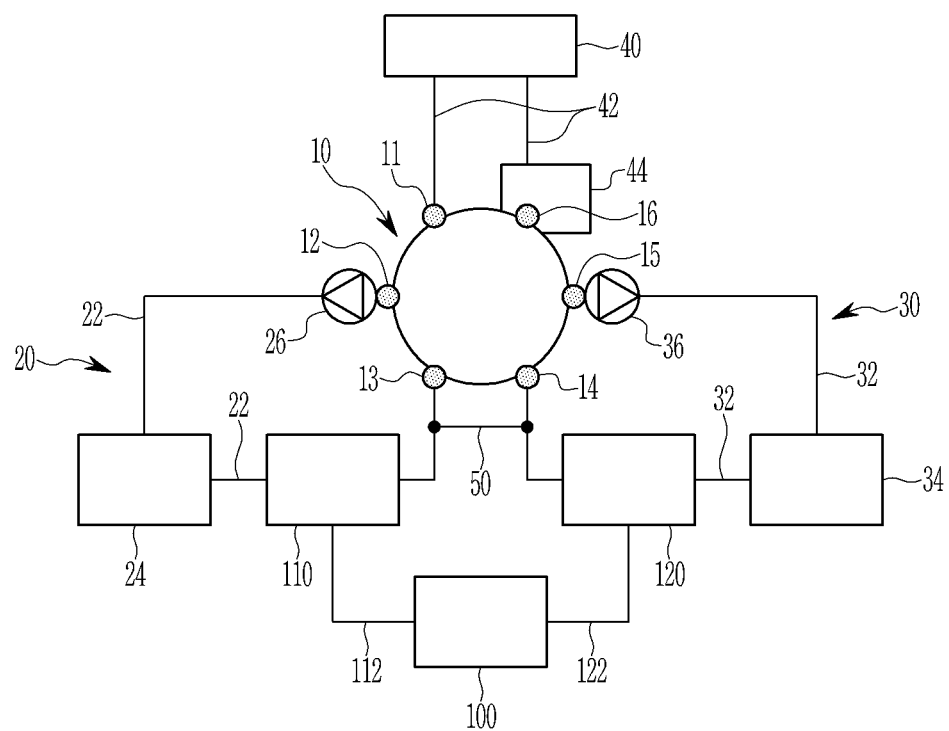
FIG. 1 is a block diagram of a heat pump system of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

Exemplary embodiments included in the present specification and the constructions depicted in the drawings are only the exemplary embodiments of the present disclosure, and do not cover the entire scope of the present disclosure. Therefore, it will be understood that there may be various equivalents and variations at the time of the application of the present specification.

To clarify the present disclosure, parts that are not related to the description will be omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

Furthermore, unless explicitly described to the contrary, the word "comprise" and variations such as "comprises" or "comprising", will be understood to imply the inclusion of stated elements but not the exclusion of any other elements.

Furthermore, each of terms, such as, " . . . unit", " . . . means", "portions", " . . . part", and " . . . member" described in the specification, mean a unit of a comprehensive element that performs at least one function or operation.

FIG. 1 is a block diagram of a heat pump system of a vehicle according to an exemplary embodiment of the present disclosure.

A heat pump system for a vehicle according to various exemplary embodiments of the present disclosure may efficiently adjust a temperature of a battery module 34 by use of a single chiller 120 where a refrigerant and a coolant are heat-exchanged, and selectively recollect waste heat of an electrical component 24 and the battery module 34 to use the same for heating of the vehicle interior.

Furthermore, the heat pump system may form a plurality of coolant flowing lines by a single valve 10 according to a selected mode of the vehicle, and among the electrical component 24 and the battery module 34 provided on the lines, the flow amount of the coolant toward the side having higher heat generation amount may be increased through a flow control line 50.

For such a purpose, according to the heat pump system, in an electric vehicle, the electrical component 24 and the battery module 34 through which the coolant circulates may be interconnected to each other through an air conditioner unit 100, a heat-exchanger 110, and the chiller 120 for circulating the refrigerant for cooling and heating of the vehicle interior.

That is, referring to FIG. 1, the heat pump system may include the valve 10, a first cooling apparatus 20, a second cooling apparatus 30, and the flow control line 50.

First, the valve 10 may be configured for controlling flow of the coolant which is internally introduced, according to at least one selected mode for temperature adjustment of the vehicle interior and temperature adjustment of the electrical component 24 and the battery module 34.

A configuration of the valve 10 will be described in more detail below.

In an exemplary embodiment of the present disclosure, the first cooling apparatus 20 may include a first line 22 of which a first end portion and a second end portion are connected to the valve 10 to selectively circulate the coolant, and the electrical component 24 and the heat-exchanger 110 provided on the first line 22.

The second cooling apparatus 30 may include a second line 32 of which a first end portion and a second end portion are connected to the valve 10 to selectively circulate the coolant, and the battery module 34 and the chiller 120 provided on the second line 32.

The heat-exchanger 110 may be connected to the air conditioner unit 100 through a refrigerant line 112 so that the refrigerant may be supplied from the air conditioner unit 100. Furthermore, the chiller 120 may be connected to the air conditioner unit 100 through the refrigerant connection line 122 so that the refrigerant may be supplied from the air conditioner unit 100.

Here, the heat-exchanger 110 and the chiller 120 may be a water-cooled heat-exchanger that heat-exchanges the internally introduced coolant with the refrigerant supplied from the air conditioner unit 100.

That is, the heat-exchanger 110 and the chiller 120 may adjust a temperature of the coolant by heat-exchanging the selectively supplied coolant with the refrigerant selectively supplied from the air conditioner unit 100.

When heating of the vehicle interior, the heat-exchanger 110 may recollect heat source from the coolant heated by the waste heat of the electrical component 24.

Furthermore, for cooling of the battery module 34, or for heating of the vehicle interior, the chiller 120 may be operated to recollect heat source from the coolant heated by the waste heat of the battery module 34.

Meanwhile, in an exemplary embodiment of the present disclosure, the valve 10 may include at least one port through which the coolant is introduced or discharged.

First, a first end portion of a third line 42 on which a radiator 40 may be provided may be connected to a first port 11.

The radiator 40 may be disposed in the front of the vehicle, and a cooling fan may be provided at a downstream side of the radiator 40. Accordingly, the radiator 40 cools the coolant through an operation of the cooling fan and heat-exchange with an ambient air.

A first end portion of the first line 22 may be connected to a second port 12. Here, a first water pump 26 to flow the coolant along the first line 22 may be mounted on the second port 12.

A second end portion of the first line 22 may be connected to a third port 13. A first end portion of the second line 32 may be connected to a fourth port 14.

In an exemplary embodiment of the present disclosure, a second end portion of the second line 32 may be connected to a fifth port 15. Here, a second water pump 36 to flow the coolant along the second line 32 may be mounted on the fifth port 15.

The first water pump 26 and the second water pump 36 may be disposed at positions facing each other, with reference to the valve 10.

In the selected mode among the at least one mode, the first water pump 26 and the second water pump 36 may be operated at different rotation speeds, depending on heat generation amounts of the electrical component 24 and the battery module 34 so that flow amounts of the coolant flowing through the first line 22 and the second line 32 are different from each other.

Furthermore, a second end portion of the third line 42 may be connected to a sixth port 16.

Here, a reservoir tank 44 may be provided on the third line 42 and mounted on the valve 10 at a position corresponding to the sixth port 16.

The valve 10 may include first, second, third, fourth, fifth and sixth ports 11, 12, 13, 14, 15, and 16. That is, the valve 10 may be a 6-Way valve provided with six ports through which the coolant is drawn and discharged.

In an exemplary embodiment of the present disclosure, the flow control line 50 may interconnect the first line 22 and the second line 32.

Here, a first end portion of the flow control line 50 may be connected to the first line 22 at a downstream side of the electrical component 24, with reference to a flow direction of the coolant flowing through the first line 22.

Furthermore, a second end portion of the flow control line 50 may be connected to the second line 32 at a downstream side of the battery module 34, with reference to the flow direction of the coolant flowing through the second line 32.

In the selected mode among the at least one mode, the flow control line 50 may redirect the coolant flowing through one line among the first line 22 or the second line 32 to another line so that a flow amount of the coolant flowing through the first line 22 or the second line 32 is increased.

In an exemplary embodiment of the present disclosure, the at least one mode may include a first mode to a fifth mode.

First, in the first mode, the electrical component 24 may be cooled by use of the coolant cooled at the radiator 40, and the battery module 34 may be cooled by use of the chiller 120.

In the second mode, the electrical component 24 and the battery module 34 may be cooled by use of the coolant cooled at the radiator 40.

In the third mode, the vehicle interior may be heated, and the waste heat of the electrical component 24 may be recollected.

In the fourth mode, the vehicle interior may be heated, and the waste heat of the electrical component 24 and the battery module 34 may be recollected.

Furthermore, in the fifth mode, the battery module 34 may be cooled by use of the coolant cooled at the radiator 40.

Here, the flow control line 50 may always maintain an opened state in the first to fifth modes.

Meanwhile, in an exemplary embodiment of the present disclosure, in the first mode, the third mode, and the fifth mode, the coolant may be prevented from flowing along the flow control line 50 due to separation of the first line 22 and the second line 32.

That is, when the heat pump system is operated in the first mode, the third mode, and the fifth mode, in initial circulation of the coolant, a pressure difference occurs at the first end portion and the second end portion of the flow control line 50 that connect the first line 22 and the second line 32 due to a difference in rotation speeds of the first water pump 26 and the second water pump 36, and thereby the coolant flow may be generated However, after a preset time has elapsed, the pressure difference between the first end portion and the second end portion of the flow control line 50 is removed, and a pressure equilibrium occurs, by which the coolant stops flowing.

To the contrary, in the second mode and the fourth mode, depending on heat generation amounts of the electrical component 24 and the battery module 34, the flow control line 50 may flow a partial coolant of the coolant flowing through the first line 22 to the second line 32, or may flow a partial coolant of the coolant flowing through the second line 32 to the first line 22.

Hereinafter, operation and action in each mode of a heat pump system of a vehicle according to an exemplary embodiment configured as described above is described in detail with reference to FIG. 2 to FIG. 6.

First, an operation in the first mode of a heat pump system according to an exemplary embodiment of the present disclosure, for cooling the electrical component 24 by use of the coolant cooled at the radiator 40, and for cooling the battery module 34 by use of the chiller 120, is described with reference to FIG. 2.

Figure 2:
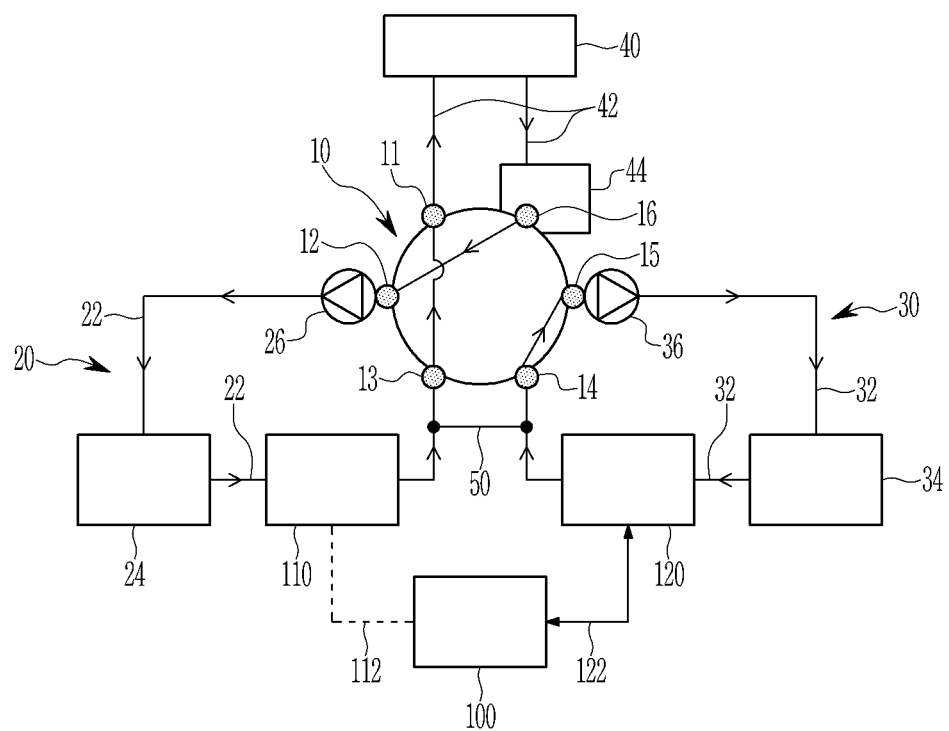
FIG. 2 is an operation diagram of a first mode of a heat pump system of a vehicle according to an exemplary embodiment of the present disclosure.

FIG. 2 is an operation diagram of a first mode of a heat pump system of a vehicle according to an exemplary embodiment of the present disclosure.

Referring to FIG. 2, in the first mode, the valve 10 is operated so that the first line 22 and the third line 42 are connected to supply the coolant cooled at the radiator 40 to the electrical component 24.

Accordingly, the sixth port 16 connected to the third line 42 may be connected to the second port 12 connected to the first line 22 by operation of the valve 10.

Simultaneously, the third port 13 connected to the first line 11 may be connected to the first port 11 by operation of the valve 10.

Accordingly, the first line 11 and the third line 13 may be interconnected, and form a single circuit for circulation of the coolant.

In such a state, when the first water pump 26 is operated, the coolant cooled at the radiator 40 is drawn into the valve 10 through the sixth port 16, and then discharged to the first line 22 connected to the second port 12.

The coolant discharged to the first line 22 passes through the electrical component 24, and then flows into the valve 10 through the third port 13. Accordingly, the coolant introduced through the third port 13 is discharged to the third line 42 connected to the first port 11.

Meanwhile, the air conditioner unit 100 may close the refrigerant line 112 so that the refrigerant is not supplied to the heat-exchanger 110.

That is, by repeatedly performing the above-described processes, the coolant cooled at the radiator 40 may circulate along the first line 22 connected to the third line 42, and efficiently cool the electrical component 24.

Meanwhile, the valve 10 may operate so that the second line 32 forms an independent closed circuit through which the coolant circulates.

Accordingly, the fourth port 14 connected to the second line 32 may be connected to the fifth port 15 connected to the second line 32 by operation of the valve 10.

Here, the air conditioner unit 100 may open a refrigerant connection line 122 so that the low temperature refrigerant is supplied to the chiller 120. Accordingly, the low temperature refrigerant is supplied to the chiller 120 from the air conditioner unit 100 through the refrigerant connection line 122.

In such a state, when the second water pump 36 is operated, the coolant circulates along the second line 32.

Accordingly, the coolant circulated along the second line 32 is cooled through heat-exchange with the low temperature refrigerant supplied to the chiller 120. The cooled coolant may circulate along the second line 32, and efficiently cool the battery module 34.

Meanwhile, as the flow control line 50 maintains the opened state, in initial circulation of the coolant, the pressure difference occurs at the first end portion and the second end portion of the flow control line 50 that connect the first line 22 and the second line 32 due to a difference in rotation speeds of the first water pump 26 and the second water pump 36, and thereby the coolant flow may be generated However, after the preset time has elapsed, the pressure difference between the first end portion and the second end portion of the flow control line 50 is removed, and a pressure equilibrium occurs, by which the coolant stops flowing.

That is, as the coolant circulates independently through the first line 22 and the second line 32, the coolant flow through the flow control line 50 between the coolant circulating the first line 22 and the coolant circulating the second line 32 may be prevented.

In an exemplary embodiment of the present disclosure, an operation in the second mode, for cooling the electrical component 24 and the battery module 34 by use of the coolant cooled at the radiator 40, is described with reference to FIG. 3.

Figure 3:
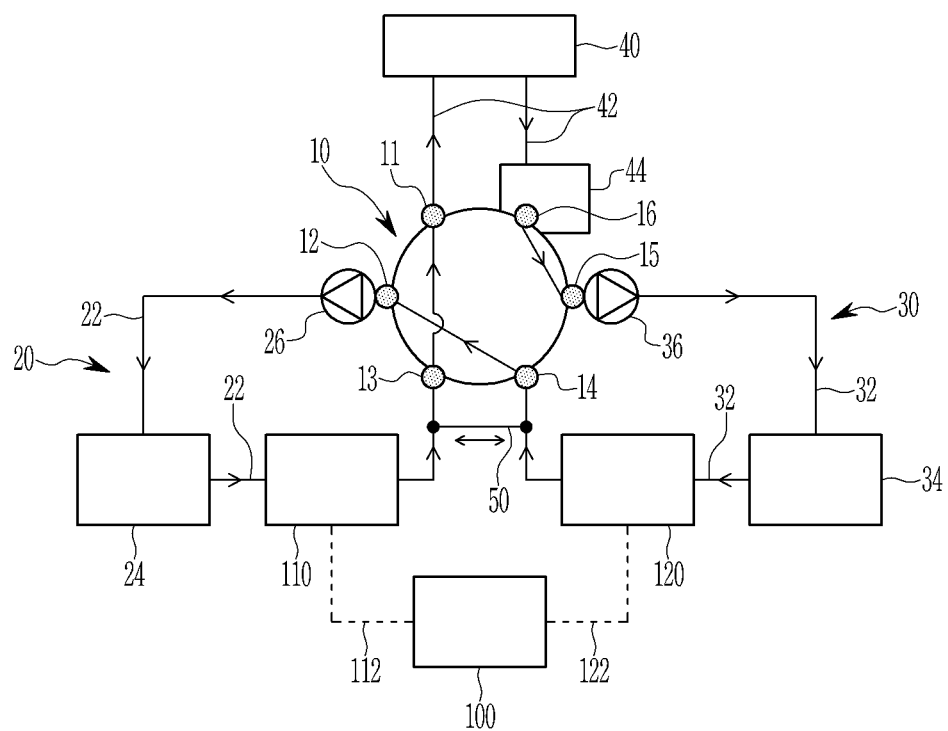
FIG. 3 is an operation diagram of a second mode of a heat pump system of a vehicle according to an exemplary embodiment of the present disclosure.

FIG. 3 is an operation diagram of a second mode of a heat pump system of a vehicle according to an exemplary embodiment of the present disclosure.

Referring to FIG. 3, in the second mode, the valve 10 is operated so that the first line 22, the second line 32, and the third line 42 are interconnected to supply the coolant cooled at the radiator 40 to the electrical component 24 and the battery module 34.

Accordingly, the sixth port 16 connected to the third line 42 may be connected to the fifth port 15 connected to the second line 32 by operation of the valve 10.

Simultaneously, the fourth port 14 connected to the second line 32 may be connected to the second port 12 connected to the first line 22 by operation of the valve 10.

Furthermore, the third port 13 connected to the first line 22 may be connected to the first port 11 by operation of the valve 10.

Here, the air conditioner unit 100 may close the refrigerant line 112 and the refrigerant connection line 122 so that the refrigerant is not supplied to the heat-exchanger 110 and the chiller 120.

In such a state, when the first and second water pumps 26 and 36 are operated, the coolant cooled at the radiator 40 is drawn into the valve 10 through the sixth port 16, and then discharged to the second line 32 connected to the fifth port 15.

The coolant discharged to the second line 32 passes through the battery module 34, and then flows into the valve 10 through the fourth port 14.

The coolant introduced through the fourth port 14 is discharged to the first line 22 connected to the second port 12. The coolant discharged to the first line 22 passes through the electrical component 24, and then flows into the valve 10 through the third port 13.

Furthermore, the coolant introduced through the third port 13 is discharged to the third line 42 connected to the first port 11.

That is, by repeatedly performing such operations, the coolant cooled at the radiator 40 may circulate along first, second, and third lines 22, 32, and 42.

Here, the coolant cooled at the radiator 40 may pass through the electrical component 24 along the first line 22, after first passing through the battery module 34 along the second line 32.

Accordingly, the coolant cooled at the radiator 40 may first passes through the battery module 34, enabling more efficient cooling.

Here, the first water pump 26 and the second water pump 36 may be operated at different rotation speeds depending on heat generation amounts of the electrical component 24 and the battery module 34.

For example, when a heat generation amount of the electrical component 24 is greater than a heat generation amount of the battery module 34, the first water pump 26 may be operated at a rotation speed higher than that of the second water pump 36 so that the coolant of a flow amount greater than the flow amount of the coolant supplied to the battery module 34 is supplied to the electrical component 24.

Accordingly, the flow control line 50 may flow a partial coolant of the coolant having passed through the electrical component 24 along the first line 22 to the second line 32, at the downstream side of the battery module 34.

Accordingly, an entire flow amount of the coolant circulating the first line 22 is increased compared to a flow amount of the coolant circulating the second line 32 prior to passing through the battery module 34, and accordingly, the electrical component 24 having relatively large heat generation amount may be cooled more efficiently.

To the contrary, when the heat generation amount of the battery module 34 is greater than the heat generation amount of the electrical component 24, the second water pump 36 may be operated at rotation speed higher than that of the first water pump 26 so that the coolant of a flow amount greater than the flow amount of the coolant supplied to the electrical component 24 is supplied to the battery module 34.

Accordingly, the flow control line 50 may flow a partial coolant of the coolant having passed through the battery module 34 along the second line 32 to the first line 22, at the downstream side of the electrical component 24.

Accordingly, an additional coolant drawn into the first line 22 through the flow control line 50 may increase the entire flow amount of the coolant flowing from the radiator 40 into the second line 32 via the third line 42.

Accordingly, the entire flow amount of the coolant circulating the second line 32 is increased compared to the flow amount of the coolant circulating the first line 22 prior to passing through the electrical component 24, and accordingly, the battery module 34 having relatively large heat generation amount may be cooled more efficiently.

That is, depending on heat generation amounts of the electrical component 24 and the battery module 34, the flow control line 50 may increase or decrease the flow amount of the coolant circulating the first line 22 or the second line 32 within a limited flow amount of the coolant circulating along the first, second, and third lines 22, 32, and 42 that are interconnected, and thereby efficiency of the entire system may be enhanced.

In an exemplary embodiment of the present disclosure, an operation in the third mode, for heating the vehicle interior and for recollecting the waste heat of the electrical component 24, is described with reference to FIG. 4.

Figure 4:
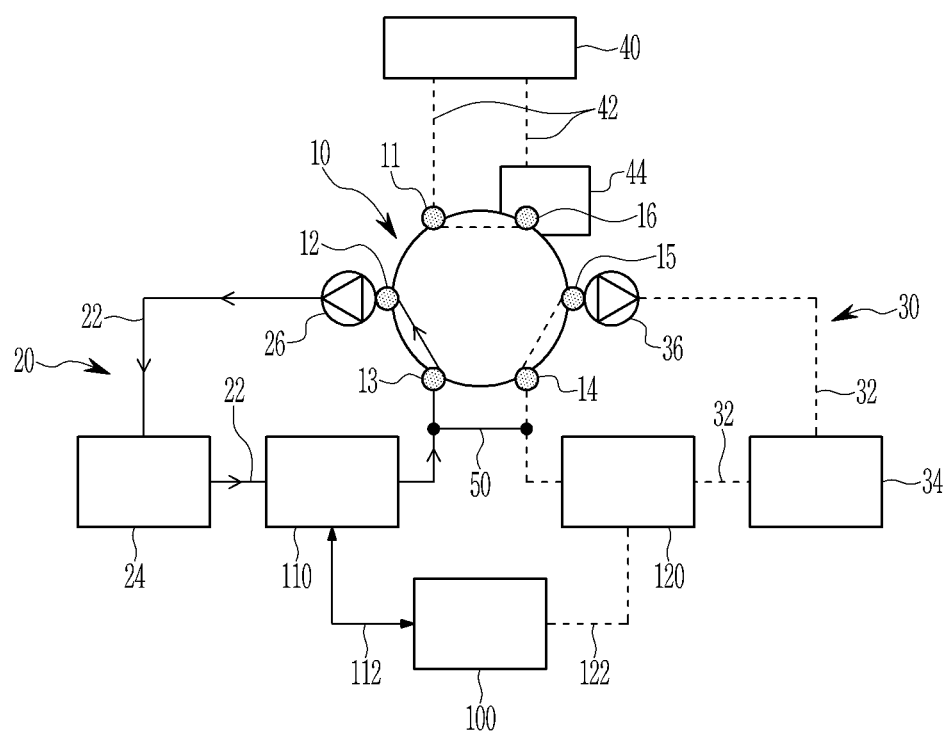
FIG. 4 is an operation diagram of a third mode of a heat pump system of a vehicle according to an exemplary embodiment of the present disclosure.

FIG. 4 is an operation diagram of a third mode of a heat pump system of a vehicle according to an exemplary embodiment of the present disclosure.

Referring to FIG. 4, in the third mode, the valve 10 is operated so that the first line 22, the second line 32, and the third line 42 form an independent closed circuit, respectively.

Accordingly, the first port 11 connected to the third line 42 may be connected to the sixth port 16 connected to the third line 42 by operation of the valve 10.

The second port 12 connected to the first line 22 may be connected to the third port 13 connected to the first line 22 by operation of the valve 10.

Furthermore, the fourth port 14 connected to the second line 32 may be connected to the fifth port 15 connected to the second line 32 by operation of the valve 10.

Here, the second water pump 36 may stop operating. Accordingly, the coolant may stop circulating through the second line 32.

Furthermore, the third line 42 is connected to the first water pump 26 and the second water pump 36, and accordingly, the coolant may stop circulating through the third line 42.

In such a state, when the first water pump 26 is operated, the coolant circulates along the first line 22 by the second port 12 and the third port 13 that are interconnected within the valve 10.

Accordingly, the coolant circulated along the first line 22 is heated while cooling the electrical component 24. The heated coolant may pass through the heat-exchanger 110.

Here, the air conditioner unit 100 may be operated to heat the vehicle interior.

That is, the air conditioner unit 100 may open the refrigerant line 112 so that the refrigerant is supplied to the heat-exchanger 110. Furthermore, the air conditioner unit 100 may close the refrigerant connection line 122 so that the refrigerant is not supplied to the chiller 120.

Accordingly, the heat-exchanger 110 may recollect the waste heat of the electrical component 24 from the coolant heated by cooling the electrical component 24.

In more detail, the coolant heated by absorbing the waste heat of the electrical component 24 increases a temperature of the refrigerant supplied to the heat-exchanger 110 while passing through the heat-exchanger 110.

That is, the heat-exchanger 110 may heat the refrigerant by heat-exchanging the coolant and the refrigerant to recollect waste heat from the coolant heated while passing through the electrical component 24. The heated refrigerant may be supplied back to the air conditioner unit 100.

Accordingly, by repeatedly performing the above-described processes, the heat-exchanger 110 may smoothly recollect the waste heat of the electrical component 24.

That is, in the third mode, by absorbing the waste heat of the electrical component 24 at the heat-exchanger 110 and using it to increase the temperature of the refrigerant, a power consumption of the compressor provided in the air conditioner unit 100 may be decreased, and a heating efficiency thereof may be enhanced.

Here, as the flow control line 50 maintains the opened state, in initial circulation of the coolant, the pressure difference occurs at the first end portion and the second end portion of the flow control line 50 that connect the first line 22 and the second line 32 due to a difference in rotation speeds of the first water pump 26 and the second water pump 36, and thereby the coolant flow may be generated However, after the preset time has elapsed, the pressure difference between the first end portion and the second end portion of the flow control line 50 is removed, and a pressure equilibrium occurs, by which the coolant stops flowing.

That is, as the coolant circulates only in the first line 22, redirecting the coolant circulating the first line 22 to the second line 32 through the flow control line 50 may be prevented.

Meanwhile, in an exemplary embodiment of the present disclosure, the second water pump 36 is not operated, but is not limited thereto, and when temperature adjustment of the battery module 34 is required, the second water pump 36 may be operated.

In the instant case, the air conditioner unit 100 may selectively open the refrigerant connection line 122 so that the refrigerant is supplied to the chiller 120 as needed.

In an exemplary embodiment of the present disclosure, an operation in the fourth mode, for heating the vehicle interior and for recollecting the waste heat of the electrical component 24 and the battery module 34, is described with reference to FIG. 5.

Figure 5:
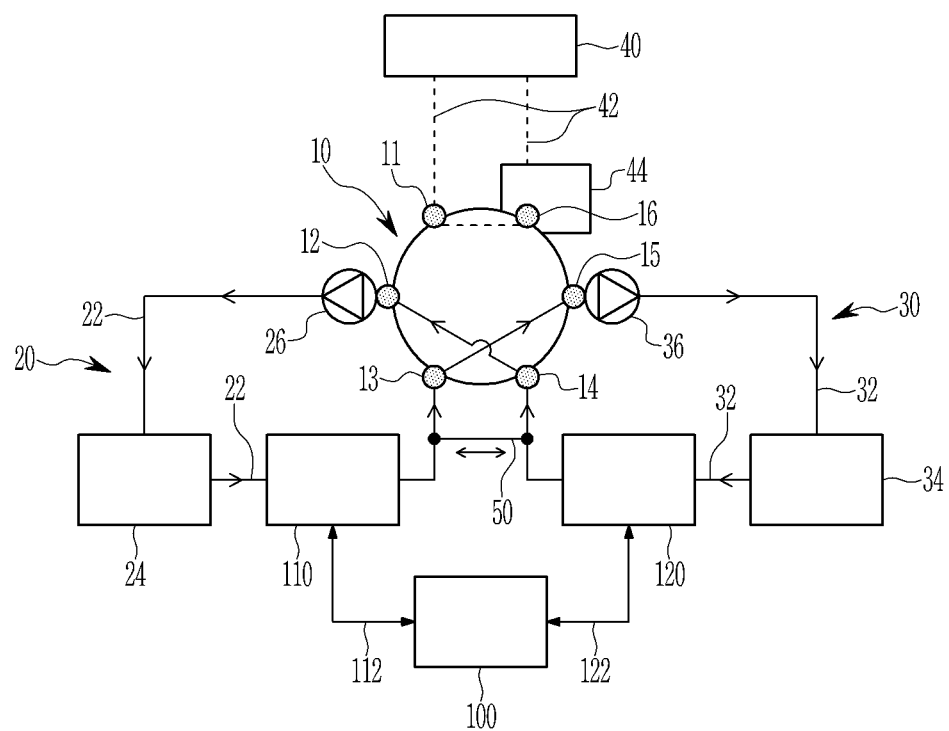
FIG. 5 is an operation diagram of a fourth mode of a heat pump system of a vehicle according to an exemplary embodiment of the present disclosure.

FIG. 5 is an operation diagram of a fourth mode of a heat pump system of a vehicle according to an exemplary embodiment of the present disclosure.

Referring to FIG. 5, in the fourth mode, the valve 10 may be operated so that the first line 22 and the second line 32 are connected to prevent the coolant having passed through the electrical component 24 and the battery module 34 from flowing to the radiator 40.

Accordingly, the first port 11 connected to the third line 42 may be connected to the sixth port 16 connected to the third line 42 by operation of the valve 10.

The second port 12 connected to the first line 22 may be connected to the fourth port 14 connected to the second line 32 by operation of the valve 10.

Furthermore, the third port 13 connected to the first line 22 may be connected to the fifth port 15 connected to the second line 32 by operation of the valve 10.

Accordingly, the third line 42 may not be connected to the first line 22 and the second line 42, and form an independent closed circuit.

Accordingly, the third line 42 is connected to the first water pump 26 and the second water pump 36, and accordingly, the coolant may stop circulating through the third line 42.

In such a state, when the first water pump 26 and the second water pump 36 are operated, the coolant discharged from the valve 10 to the first line 22 via the second port 12 passes through the electrical component 24, and then flows into the valve 10 through the third port 13.

The coolant introduced through the third port 13 is discharged to the second line 32 connected to the fifth port 15. The coolant discharged to the second line 32 passes through the battery module 34, and then flows into the valve 10 through the fourth port 14.

The coolant introduced through the fourth port 14 may be discharged to the first line 22 connected to the second port 12.

That is, by repeatedly performing the above-described processes, the coolant may circulate along the first line 22 and the second line 32.

Here, the air conditioner unit 100 may be operated to heat the vehicle interior.

That is, the air conditioner unit 100 may open the refrigerant line 112 and the refrigerant connection line 122 so that the refrigerant is supplied to the heat-exchanger 110 and the chiller 120.

Accordingly, the heat-exchanger 110 and the chiller 120 may recollect the waste heat of the electrical component 24 and the battery module 34 respectively from the coolants heated while cooling the electrical component 24 and the battery module 34.

In more detail, the coolant heated by absorbing the waste heat of the electrical component 24 increases the temperature of the refrigerant supplied to the heat-exchanger 110 pass through the heat-exchanger 110 along the first line 22.

Furthermore, the coolant heated by absorbing the waste heat of the battery module 34 may heat the refrigerant supplied to the chiller 120 while passing through the chiller 120 along the second line 32.

That is, the heat-exchanger 110 and the chiller 120 may heat the refrigerant by heat-exchanging the coolant and the refrigerant to recollect waste heat from the coolant heated while passing through the electrical component 24 and the battery module 34 respectively. The heated refrigerant may be supplied back to the air conditioner unit 100.

Accordingly, by repeatedly performing the above-described processes, the heat-exchanger 110 and the chiller 120 may smoothly recollect the waste heat of the electrical component 24 and the battery module 34.

That is, in the fourth mode, by each absorbing the waste heat of the electrical component 24 and the battery module 34 at the heat-exchanger 110 and the chiller 120 and using it to increase the temperature of the refrigerant, a power consumption of the compressor provided in the air conditioner unit 100 may be decreased, and a heating efficiency thereof may be enhanced.

Meanwhile, in the fourth mode According to the exemplary embodiment of the present disclosure, the first water pump 26 and the second water pump 36 may be operated at different rotation speeds depending on heat generation amounts of the electrical component 24 and the battery module 34.

For example, when the heat generation amount of the electrical component 24 is greater than the heat generation amount of the battery module 34, the first water pump 26 may be operated at the rotation speed higher than that of the second water pump 36 so that the coolant of a flow amount greater than the flow amount of the coolant supplied to the battery module 34 is supplied to the electrical component 24.

Accordingly, the flow control line 50 may flow the partial coolant of the coolant having passed through the electrical component 24 along the first line 22 to the second line 32, at the downstream side of the battery module 34.

Accordingly, the entire flow amount of the coolant circulating the first line 22 is increased compared to the flow amount of the coolant circulating the second line 32 prior to passing through the battery module 34, and accordingly, the electrical component 24 having relatively large heat generation amount may be cooled more efficiently.

To the contrary, when the heat generation amount of the battery module 34 is greater than the heat generation amount of the electrical component 24, the second water pump 36 may be operated at rotation speed higher than that of the first water pump 26 so that the coolant of a flow amount greater than the flow amount of the coolant supplied to the electrical component 24 is supplied to the battery module 34.

Accordingly, the flow control line 50 may flow the partial coolant of the coolant having passed through the battery module 34 along the second line 32 to the first line 22, at the downstream side of the electrical component 24.

Accordingly, the additional coolant drawn into the first line 22 through the flow control line 50 may increase the entire flow amount of the coolant inflowing through the second line 32.

Accordingly, the entire flow amount of the coolant circulating the second line 32 is increased compared to the flow amount of the coolant circulating the first line 22 prior to passing through the electrical component 24, and accordingly, the battery module 34 having relatively large heat generation amount may be cooled more efficiently.

That is, depending on heat generation amounts of the electrical component 24 and the battery module 34, the flow control line 50 may increase or decrease the flow amount of the coolant circulating the first line 22 or the second line 32 within a limited flow amount of the coolant circulating along the first line 22 and the second line 32 that are interconnected, and thereby efficiency of the entire system may be enhanced.

Furthermore, an operation in the fifth mode, for cooling the battery module 34 by use of the coolant cooled at the radiator 40, is described with reference to FIG. 6.

Figure 6:
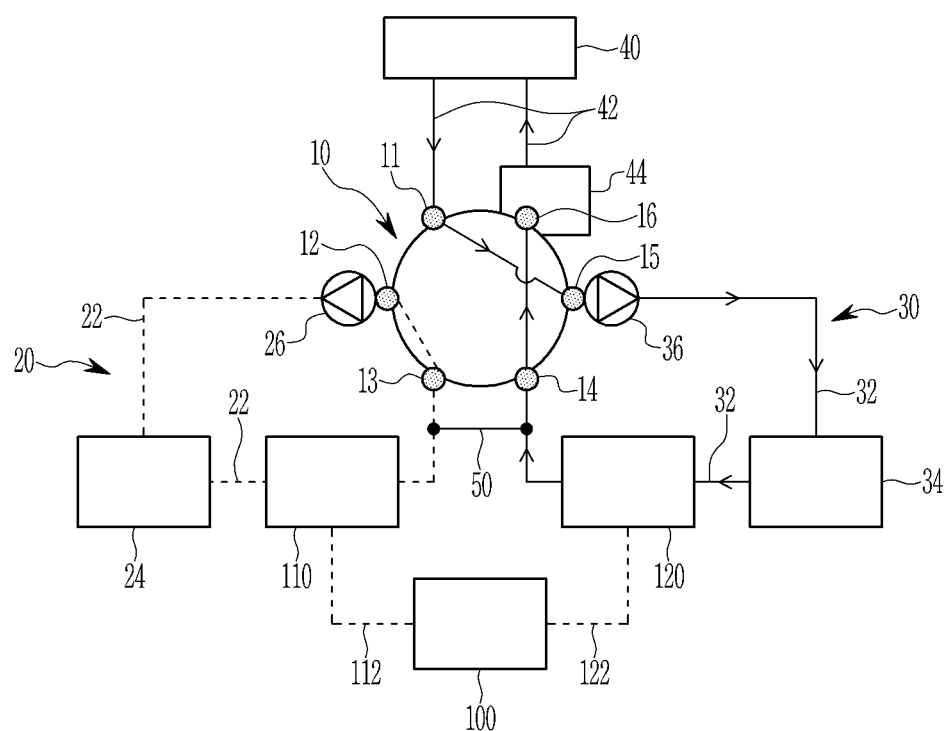
FIG. 6 is an operation diagram of a fifth mode of a heat pump system of a vehicle according to an exemplary embodiment of the present disclosure.

FIG. 6 is an operation diagram of a fifth mode of a heat pump system of a vehicle according to an exemplary embodiment of the present disclosure.

Referring to FIG. 6, in the fifth mode, the valve is operated so that the second line 32 and the third line 42 are connected to supply the coolant having passed through the radiator 40 to the battery module 34.

Accordingly, the first port 11 connected to the third line 42 may be connected to the fifth port 15 connected to the second line 32 according to operation of the valve 10.

Simultaneously, the second port 12 connected to the first line 22 may be connected to the third port 13 connected to the first line 22 according to operation of the valve 10.

Accordingly, the first line 22 may form an independent closed circuit according to operation of the valve 10.

Here, the first water pump 26 may stop operating. Therefore, the coolant stops circulating through the first line 22.

Furthermore, the fourth port 14 connected to the second line 32 may be connected to the sixth port 16 connected to the third line 42 according to operation of the valve 10.

Here, the air conditioner unit 100 may close the refrigerant line 112 and the refrigerant connection line 122 so that the refrigerant is not supplied to the heat-exchanger 110 and the chiller 120.

In such a state, when the second water pump 36 is operated, the coolant cooled at the radiator 40 is drawn into the valve 10 through the first port 16, and then discharged to the second line 32 connected to the fifth port 15.

The coolant discharged to the second line 32 passes through the battery module 34, and then flows into the valve 10 through the fourth port 14.

The coolant introduced through the fourth port 14 is discharged to the third line 42 connected to the sixth port 16.

That is, by repeatedly performing such operations, the coolant cooled at the radiator 40 may circulate along the second line 32 and the third line 42.

Accordingly, the coolant cooled at the radiator 40 may efficiently cool the electrical component 24.

Meanwhile, as the flow control line 50 maintains the opened state, in initial circulation of the coolant, the pressure difference occurs at the first end portion and the second end portion of the flow control line 50 that connect the first line 22 and the second line 32 due to a difference in rotation speeds of the first water pump 26 and the second water pump 36, and thereby the coolant flow may be generated However, after the preset time has elapsed, the pressure difference between the first end portion and the second end portion of the flow control line 50 is removed, and a pressure equilibrium occurs, by which the coolant stops flowing.

That is, as the coolant circulates only in the second line 32, redirecting the coolant circulating the second line 32 to the first line 22 through the flow control line 50 may be prevented.

Meanwhile, in an exemplary embodiment of the present disclosure, the first water pump 26 is not operated, but is not limited thereto, and when temperature adjustment of the electrical component 24 is required, the first water pump 26 may be operated.

In the instant case, the air conditioner unit 100 may selectively open the refrigerant line 122 so that the refrigerant is supplied to the heat-exchanger 110 as needed.

Therefore, according to a heat pump system for a vehicle according to an exemplary embodiment of the present disclosure, a temperature of the battery module 34 is adjusted by use of the chiller 120 where the refrigerant and the coolant are heat-exchanged, and the waste heat of the electrical component 24 and the battery module 34 is the selectively recollected and used for heating of the vehicle, enhancing the overall efficiency of the system.

Furthermore, according to an exemplary embodiment of the present disclosure, streamlining and simplification of the system may be achieved by forming the plurality of coolant flowing lines, by a single the valve 10 according to the selected mode of the vehicle.

Furthermore, according to an exemplary embodiment of the present disclosure, the flow amount of the coolant toward the side having higher heat generation amount, among the electrical component 24 provided on the first line 22 and the battery module 34 provided on the second line 32, is increased through the flow control line 50 for cooling, and the electrical component 24 and the battery module 34 may be cooled more efficiently, minimizing unnecessary power consumption, and enhancing overall marketability.

Furthermore, according to an exemplary embodiment of the present disclosure, by efficiently adjusting the temperature of the battery module 34, the optimal performance of the battery module 34 may be enabled, and the overall travel distance of the vehicle may be increased due to the efficient management of the battery module 34.

Furthermore, according to an exemplary embodiment of the present disclosure, it is possible to reduce manufacturing cost and weight through simplification of an entire system, and to improve space utilization.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A heat pump system for a vehicle, the heat pump system comprising:
   a valve configured to control flow of a coolant, according to at least one mode for temperature adjustment of a vehicle interior and temperature adjustment of an electrical component and a battery module;
   a first cooling apparatus that includes a first line of which a first end portion and a second end portion are connected to the valve to selectively circulate the coolant, to the electrical component and a heat-exchanger provided on the first line;
   a second cooling apparatus that includes a second line of which a first end portion and a second end portion are connected to the valve to selectively circulate the coolant, to the battery module and a chiller provided on the second line; and
   a flow control line fluidically connecting the first line and the second line.

2. The heat pump system of claim 1, wherein, in a selected mode among the at least one mode, the flow control line redirects the coolant flowing through one line among the first line or the second line to another line among the first line or the second line so that a flow amount of the coolant flowing through the first line or the second line is increased.

3. The heat pump system of claim 2,
   wherein a first end portion of the flow control line is connected to the first line at a downstream side of the electrical component, with reference to a flow direction of the coolant flowing through the first line, and
   wherein a second end portion of the flow control line is connected to the second line at a downstream side of the battery module, with reference to the flow direction of the coolant flowing through the second line.

4. The heat pump system of claim 2, wherein the valve includes at least one port.

5. The heat pump system of claim 4, wherein the at least one port includes:
   a first port connected to a first end portion of a third line on which a radiator is provided;
   a second port connected to a first end portion of the first line;
   a third port connected to a second end portion of the first line;
   a fourth port connected to a first end portion of the second line;
   a fifth port connected to a second end portion of the second line; and
   a sixth port connected to a second end portion of the third line.

6. The heat pump system of claim 5, further including a first water pump and a second water pump,
   wherein the first water pump to flow the coolant along the first line is mounted on the second port, and
   wherein the second water pump to flow the coolant along the second line is mounted on the fifth port.

7. The heat pump system of claim 6, wherein the first water pump and the second water pump are disposed at positions facing each other, with reference to the valve.

8. The heat pump system of claim 6, wherein, in the selected mode among the at least one mode, the first water pump and the second water pump are operated at different rotation speeds, depending on heat generation amounts of the electrical component and the battery module so that flow amounts of the coolant flowing through the first line and the second line are different from each other.

9. The heat pump system of claim 5, wherein the at least one mode includes a second mode for cooling the electrical component and the battery module by use of the coolant cooled at the radiator.

10. The heat pump system of claim 9, wherein the at least one mode further includes:
    a first mode for cooling the electrical component by use of the coolant cooled at the radiator and for cooling the battery module by use of the chiller;
    a third mode for heating the vehicle interior and recollecting waste heat of the electrical component;
    a fourth mode for heating the vehicle interior and recollecting waste heat of the electrical component and the battery module; and
    a fifth mode for cooling the battery module by use of the coolant cooled at the radiator.

11. The heat pump system of claim 10, wherein, in the first mode:
    the sixth port is fluidically connected to the second port according to operation of the valve so that the first line and the third line are fluidically connected to supply the coolant cooled at the radiator to the electrical component;
    the third port is fluidically connected to the first port according to operation of the valve; and
    the fourth port is fluidically connected to the fifth port according to operation of the valve so that the second line forms an independent closed circuit.

12. The heat pump system of claim 10, wherein, in the third mode in which the first line, the second line, and the third line form an independent closed circuit, respectively:
    the first port is fluidically connected to the sixth port according to operation of the valve;
    the second port is fluidically connected to the third port according to operation of the valve;
    the fourth port is fluidically connected to the fifth port according to operation of the valve; and
    the heat-exchanger is configured to recollect the waste heat of the electrical component from the coolant heated by cooling the electrical component.

13. The heat pump system of claim 10, wherein, in the fourth mode in which the first line and the second line are interconnected to prevent the coolant having passed through the electrical component and the battery module from flowing to the radiator:
    the first port is fluidically connected to the sixth port according to operation of the valve;
    the second port is fluidically connected to the fourth port according to operation of the valve;
    the third port is fluidically connected to the fifth port according to operation of the valve;
    the heat-exchanger is configured to recollect the waste heat of the electrical component from the coolant heated by cooling the electrical component; and
    the chiller is configured to recollect the waste heat of the battery module from the coolant heated by cooling the battery module.

14. The heat pump system of claim 10, wherein, in the fifth mode in which the second line and the third line are connected to supply the coolant having passed through the radiator to the battery module:
    the first port is fluidically connected to the fifth port according to operation of the valve;

the second port is fluidically connected to the third port according to operation of the valve; and the fourth port is fluidically connected to the sixth port according to operation of the valve.

15. The heat pump system of claim 10, wherein the flow control line always maintains an opened state in the first, second, third, fourth and fifth modes.

16. The heat pump system of claim 10, wherein, in the first mode, the third mode and the fifth mode, the coolant is prevented from flowing along the flow control line due to separation of the first line and the second line.

17. The heat pump system of claim 10, wherein in the second mode and the fourth mode, depending on heat generation amounts of the electrical component and the battery module, the flow control line flows a partial amount of the coolant flowing through the first line to the second line, or flows a partial amount of the coolant flowing through the second line to the first line.

18. The heat pump system of claim 9, wherein, in the second mode in which the first line, the second line, and the third line are interconnected to supply the coolant cooled at the radiator to the electrical component and the battery module:

the sixth port is fluidically connected to the fifth port according to operation of the valve;

the fourth port is fluidically connected to the second port according to operation of the valve; and the third port is fluidically connected to the first port according to operation of the valve.

19. The heat pump system of claim 18, wherein, in the second mode, the coolant cooled at the radiator first passes through the battery module along the second line, and then passes through the electrical component along the first line.

20. The heat pump system of claim 5, wherein a reservoir tank is provided on the third line and mounted on the valve at a position corresponding to the sixth port.

21. The heat pump system of claim 1, wherein the heat-exchanger is connected to the air conditioner unit through a refrigerant line so that a refrigerant is supplied from an air conditioner unit, and wherein the chiller is connected to the air conditioner unit through a refrigerant connection line so that the refrigerant is supplied from the air conditioner unit.

22. The heat pump system of claim 21, wherein the heat-exchanger and the chiller are water-cooled heat-exchangers that heat-exchange the coolant with the refrigerant supplied from the air conditioner unit.

* * * * *